United States Patent [19]

Barmatz et al.

[11] 4,393,708
[45] Jul. 19, 1983

[54] ACOUSTIC SYSTEM FOR MATERIAL TRANSPORT

[75] Inventors: Martin B. Barmatz, Glendale; Eugene H. Trinh, Los Angeles; Taylor G. Wang, Glendale; Daniel D. Elleman, San Marino; Nathan Jacobi, Pasadena, all of Calif.

[73] Assignee: The United States of America as represented by the Administrator of the National Aeronautics and Space Administration, Washington, D.C.

[21] Appl. No.: 314,929

[22] Filed: Oct. 26, 1981

[51] Int. Cl.³ ........................................... H02N 11/00
[52] U.S. Cl. ........................................ 73/505; 60/721
[58] Field of Search .............. 73/505; 60/721; 308/10; 310/300

[56] References Cited

U.S. PATENT DOCUMENTS

| | | | |
|---|---|---|---|
| 3,673,872 | 7/1972 | Ensley | 73/505 |
| 3,882,732 | 5/1975 | Fletcher | 73/505 |
| 4,052,181 | 10/1977 | Wang et al. | 73/505 X |
| 4,139,806 | 2/1979 | Kanber et al. | 73/505 |
| 4,218,921 | 8/1980 | Oran et al. | 73/505 |

Primary Examiner—James J. Gill

Attorney, Agent, or Firm—Paul F. McCaul; John R. Manning; Thomas H. Jones

[57] ABSTRACT

A system is described for acoustically moving an object within a chamber, by applying wavelengths of different modes to the chamber to move the object between pressure wells formed by the modes. In one system, the object (96, FIG. 7) is placed in a first end portion of the chamber while a resonant mode is applied along the length of the chamber that produces a pressure well (86) at that location. The frequency is then switched to a second mode that produces a pressure well (100) at the center of the chamber, to draw the object thereto. When the object reaches the second pressure well and is still travelling towards the second end of the chamber, the acoustic frequency is again shifted to a third mode (which may equal the first mode) that has a pressure well (106) in the second end portion of the chamber, to draw the object thereto. A heat source (108) may be located near the second end of the chamber to heat the sample, and after the sample is heated it can be cooled by moving it in a corresponding manner back to the first end portion of the chamber. The transducers (88, 98, 110) for levitating and moving the object may be all located at the cool first end of the chamber.

9 Claims, 11 Drawing Figures

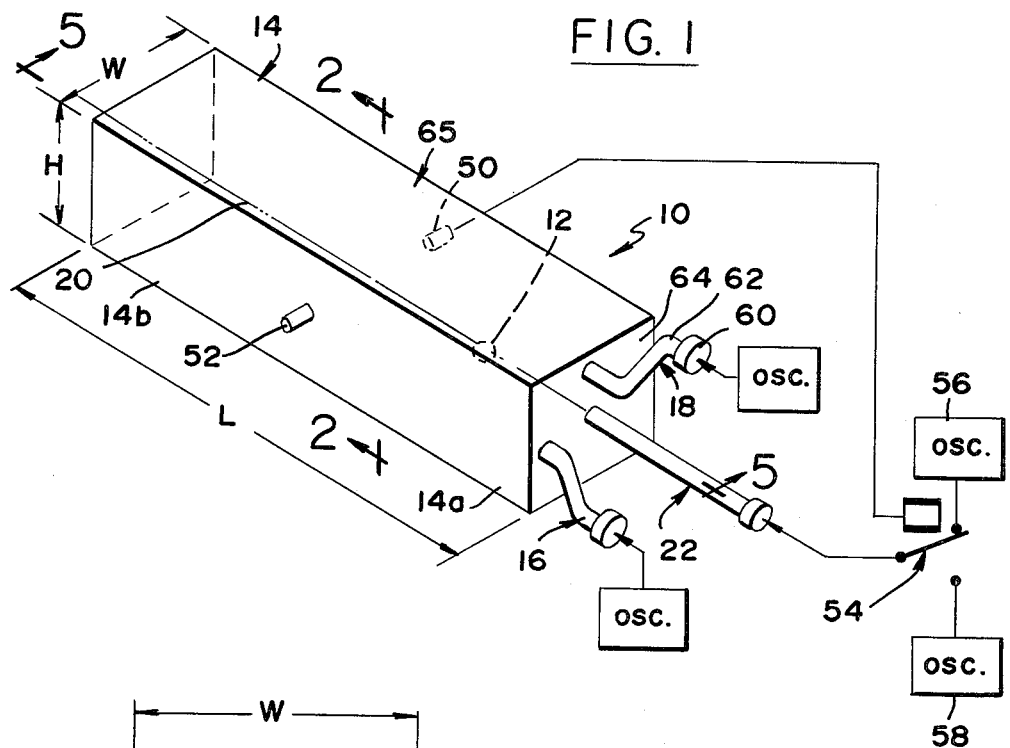
FIG. 1
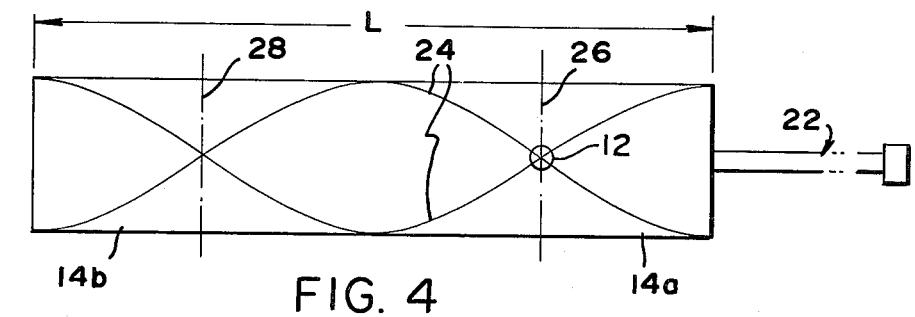
FIG. 2
FIG. 3
FIG. 4

FIG. 5
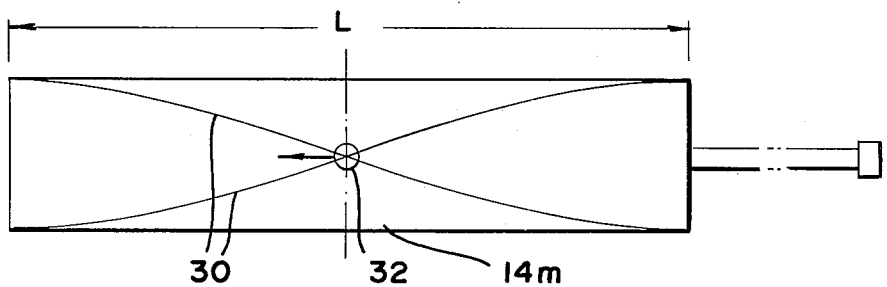
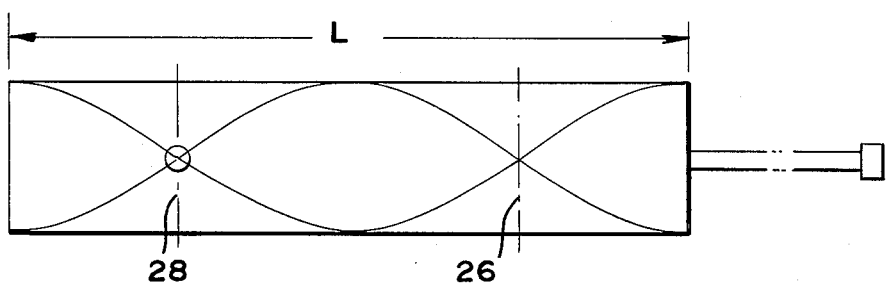
FIG. 6
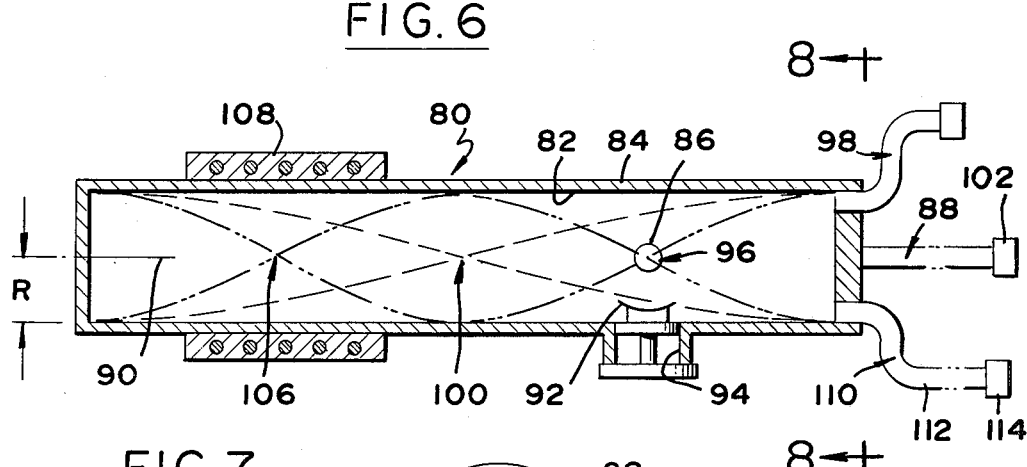
FIG. 7
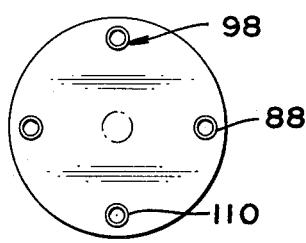
FIG. 8

ACOUSTIC SYSTEM FOR MATERIAL TRANSPORT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

It has been recognized that the levitation of objects without contacting them, as by the use of acoustic, magnetic, and electrostatic forces, has considerable potential value in the production of objects that are substantially free of contaminants. Such processes are especially promising for use under substantially zero gravity environments (in outer space) in processes such as melting and quenching metallurgical samples, forming nuclear reactor fusion targets, and the growing of crystals. The processes often involve moving the levitated object, so that techniques are required to control object movements within a chamber. U.S. Pat. No. 3,882,732 by Wang et al., describes a method for moving an acoustically levitated object, by moving the walls of the chamber in which the object lies while varying the levitating frequency to account for the change in chamber dimension. Object-moving techniques which did not require the movement of chamber walls, could permit simpler and more versatile object movements.

SUMMARY OF THE INVENTION

In accordance with one embodiment of the present invention, a method and apparatus are provided for controlling movement of an object within a chamber. Two different frequencies that are each resonant to a dimension of the chamber, are propagated along the same chamber dimension, to establish two different pressure wells to which an object can be drawn. The intensities of the two acoustic modes are varied to draw the object from a pressure well of one mode to a pressure well of the other. In one method, only a first mode is initially established along a predetermined chamber dimension such as its length, with a mode being chosen which has a pressure well at a first end portion of the chamber. The object is placed near the pressure well of the first mode, and the frequency is then changed to a second mode having a second pressure well at another location such as the middle of the length of the chamber, to draw the object to a second pressure well. When the object has reached the second pressure well, but is still moving away from the first well, the frequency is again switched to a third mode (which may equal the first mode) that has a third pressure well at the second end portion of the chamber. The object continues to move past the second well and into the third one.

In another embodiment of the invention, two different modes are energized simultaneously, and the relative intensities of the modes are varied to move the object between the two spaced pressure wells of the two modes. In any of the cases, acoustic energies of a plurality of different frequencies for levitating the object in all dimensions, can all be applied to the same end portion of the chamber. In a chamber heated at only one end, this permits all transducers to be located at the opposite cool end.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified perspective view of a processing apparatus constructed in accordance with one embodiment of the invention.

FIG. 2 is a view along line 2—2 of FIG. 1, which represents waves propagated along the chamber width.

FIG. 3 is a view similar to FIG. 2, but representing waves travelling along the chamber height.

FIG. 4 is a view along line 5—5 of FIG. 1, showing emplacement of an object in the chamber.

FIG. 5 is a view similar to FIG. 4, but showing another acoustic mode which can move the object to the middle of the chamber.

FIG. 6 is a view similar to FIG. 5, but showing the modes switched again to move the object to a second end portion of the chamber.

FIG. 7 is a sectional view of a processing apparatus constructed in accordance with another embodiment of the invention, wherein the chamber is of cylindrical shape and is used to heat an object.

FIG. 8 is a view taken on the line 8—8 of FIG. 7.

DESCRIPTION OF THE PREFERRED EMBODIMENTS

Figure 10:
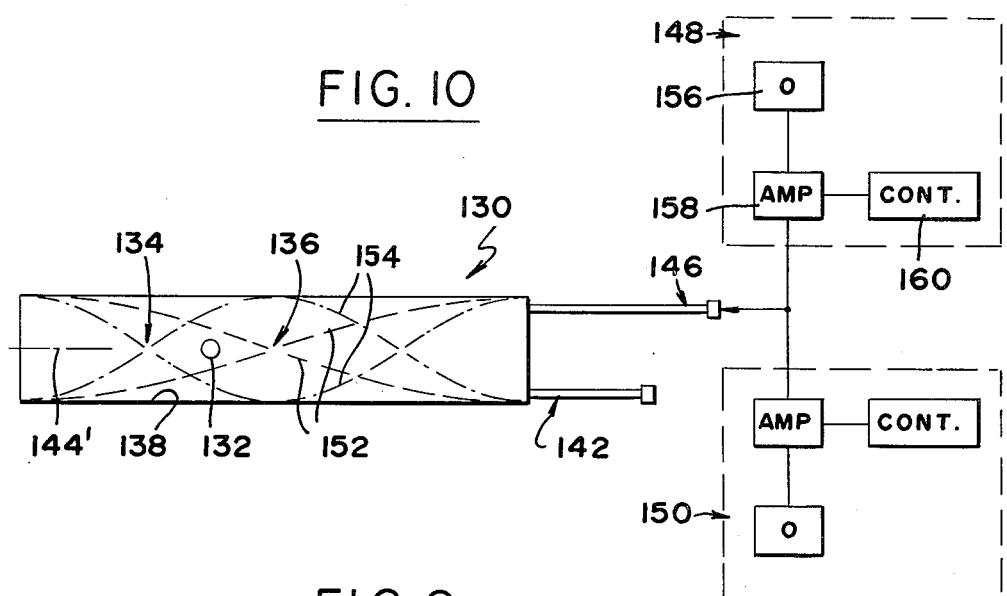
FIG. 10 is a simplified sectional view of apparatus of another embodiment of the invention, wherein the object is moved between two pressure walls by varying the relative intensities of two acoustic modes.

FIG. 1 illustrates a system 10 which can be used to control the movement of an object 12 within a chamber 14. The particular chamber 14 is a parallelepiped having a predetermined length L, width W, and heigth H. A pair of acoustic transducers 16, 18 levitate the sample along the width and height, respectively, to hold the object along the longitudinal centerline 20 of the chamber, which extends along its length. Another transducer 22 controls the particular position of the object along the longitudinal center line, and can move it from one end portion 14a of the chamber to the opposite end portion 14b. All of the transducers are driven to produce high intensity acoustic waves that can levitate or move the object 12.

FIGS. 4 through 6 show how the object can be moved between opposite end portions of the chamber, by altering the frequency at which the length transducer 22 is driven. In FIG. 4, the transducer 22 is driven at the second lowest mode which is resonant to the length L of the chamber, which is at a frequency that produces acoustic waves of a wavelength, indicated by the graphs 24, that is equal to the length L of the chamber. This second mode produces pressure wells at the cross-sectional planes of locations 26 and 28 along the length of the chamber, which are also the pressure nodes (minimum pressure) in this system. To move the object along the length of the chamber, the frequency of the transducer 22 is shifted to the first mode, which produces the pressure graph shown at 30 in FIG. 5. This lowest mode, which produces a wavelength equal to twice the length of the chamber, results in a pressure well at the middle 14m of the chamber at the position 32. The object is pushed or drawn into this pressure well 32 by high intensity acoustic pressure.

As the object in FIG. 5 reaches the center pressure well 32, but is still moving to the left in the figure, the frequency of the transducer 22 is again switched back to the second lowest mode, as shown in FIG. 6, which again produces pressure wells at 26 and 28. Although the object could move into either pressure well, the fact that the frequency was switched immediately after the object passed the center of the chamber and was moving to the left, results in its moving to the left-hand pressure well 28. Thus, by appropriately switching between different resonant modes, the position of the object can be controlled so it can be moved from one end portion of the chamber to the other, such as from an initial side at 26 of a center pressure well 32, to a final side at 28, and back again.

As mentioned earlier, the two transducers 16, 18 (FIG. 1) hold the object along the centerline 20 of the chamber. FIG. 2 shows that when the width transducer 16 is driven at the lowest mode along the chamber width, the transducer produces resonant acoustic waves 36 that form a pressure well along the plane 38 which is at the center of the width W of the chamber. FIG. 3 shows that when the height transducer 18 is driven at the lowest resonant mode along the height of the chamber, it produces acoustic waves 40 that generate a pressure well along a plane 42 which is at the center of the height of the chamber. Thus the two transducers 16, 18 hold the object near the centerline 20 of the chamber, along which it can be moved by the other transducer 22.

FIG. 1 shows that movement of the object 12 past the center of the length of the chamber can be detected by an optical detector 50 illuminated by a narrow light source 52. The detection of the object moving thereby can be used to operate a switch 54 to disconnect the transducer 22 from a first signal generator or oscillator 56 which generates a signal or current of the lowest or first mode along the length of the chamber, and to connect it to a second oscillator 58 which generates the second mode. Other techniques can be used to detect the object position, as by devices located at the cool end of the chamber, such as one which uses an ultrasonic pulse echo technique.

Each of the transducers 16, 18 and 22 shown in FIG. 1, include a transducer element 60 and a tube 62 which connects the element to an opening in the chamber. Where the chamber is to be heated to a temperature that would affect the transducer element 60, the tube 62 is useful to isolate the transducer element from the high temperature in the chamber. The length of each tube is chosen to equal a whole number of half wavelengths of the acoustic energy generated by the corresponding element 60. Since the maximum DC or constant pressure exists at the element 60 and at locations spaced an integral number of half wavelengths from it, and since maximum (or at least a large) DC pressure must exist at the walls of the chamber to produce resonance, the above-mentioned choice of tube length can produce maximum resonances in the chamber. It may be noted that when the chamber is heated near one end so that large temperature gradients are present, the waveforms are somewhat distorted from those shown, and the frequency has to be shifted slightly.

The three transducers 16, 18 and 22 are all connected through openings at an end 64 of the chamber housing 65. The width transducer 16 and height transducer 18 can both establish standing wave patterns regardless of where, along the length L of the chamber, they are positioned, since multiple reflections between opposite walls of the chamber will distribute any resonant frequency throughout the length of the chamber. This occurs where the chamber reflects almost all acoustic energy off its walls, so that multiple reflections of acoustic energy distributes it along the length of the chamber. The locations where the transducers are coupled to the chamber should be close to positions of maximum pressure, so that the width transducers 16 (FIG. 2) opens near one edge 70 of the chamber whose opposite edge or wall 71 is separated by the chamber width W. Similarly, the height transducer 18 (FIG. 3) is positioned so it is coupled to an edge 72 of the chamber where the opposite edge or wall is separated by the height H of the chamber. The multiple reflections distribute the acoustic energy, and the amount of energy buildup in the chamber is described by the quality factor Q (the larger the Q, the larger the buildup). A Q of 100 is typical of chambers with quartz walls which applicant has experimented with. The Q number can be represented as the ratio between the frequency of a resonant acoustic wave to the bandwidth over which the intensity of the standing wave pattern remains within three decibels of the maximum intensity (which is achieved at the center of the bandwidth). A Q of one-fifth the typical value of 100 (i.e., a Q of 20) is sufficient to enable the multiple reflections to produce an intense acoustic field, as when the width and height transducers 16, 18 are coupled to an end of the chamber.

FIGS. 7 and 8 illustrate a system 80 which utilizes the same basic method of the system of FIGS. 1-6, except that the chamber 82 is within a cylindrical tube 84. This system is used to heat and then quench an object while avoiding contact of the heated object with any solid container that could contaminate the object material. The object 86 is initially placed in the chamber by applying acoustic energy through the transducer 88 at the second mode along the length axis 90 of the chamber. The object is then placed on a positioner 92 formed by a screen that can be withdrawn through an opening 94 in the chamber. Once the object has been positioned on the screen positioner 92, so it is a moderate distance away from the walls of the chamber, the object will move to the position shown at 96 in FIG. 7. During or prior to this time, another transducer 98 is energized at a frequency which is resonant to the circular cross-section of the chamber. For a chamber of predetermined radius R, the transducer 98 may be driven at a frequency that produces a wavelength equal to 3.41 R, which will position the sample along the axis of the cylinder.

The object is moved past a position 100 by switching the frequency of an oscillator 102 of the transducer device 88, to a frequency having a pressure well at 100, and then switching back to the initial frequency which has wells at 96 and 106, to bring the object to the position 106. A heating device 108 positioned at the object location 106, then heats the object. The heating device 108 may be an induction furnace, laser beam or a variety of other heating devices. The object 86 may, for example, consist of two different metals which cannot be alloyed under a large gravitational field, but can be alloyed under nearly zero gravity if melted together. The system 80 avoids the need for providing a container that can hold the high temperature alloy and which might contaminate it, as well as providing a means for rapidly quenching the melted object. Such quenching can be obtained by rapidly returning the heated object at 106 back to a cooled end of the cylinder at 96. It is noted that while only two transducers 88, 98 are required, operation of the system can be facilitated by providing additional transducers such as 110, which may have a tube 112 of different length than that of another transducer such as 88. The tube 112 facilitates coupling of acoustic waves from the transducer element 114 to the chamber, where the chamber is heated so that the temperature at the normally cool end of the chamber may become temporarily heated.

Figure 9:
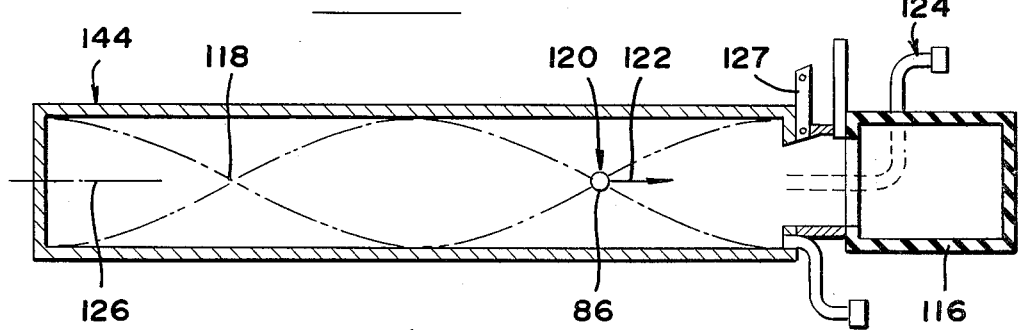
FIG. 9 is a sectional view of a processing apparatus constructed in accordance with another embodiment of the invention.

FIG. 9 illustrates a system 144 somewhat similar to that of FIG. 7, except that it also includes an insulated cooled chamber 116 for rapid quenching of the object 86. If the object were located at 118 and had been heated, and must be rapidly quenched, it can be moved to the right in the figure until it reaches the position 120. Then, as it continues moving to the right, as shown by the arrow 122, the transducer 124 (which opens to an edge of the chamber in the same manner as 88 in FIG. 8) which generates a standing wave pattern along the length axis 126 of the system can be turned off, so the object continues to move to the right until it enters the chamber 116. A cover 127 is opened by camming it to the right and lifting it out of the way. The chamber 116 can be filled with a quenching liquid or the like. This system enables very rapid quenching of the heated object under almost zero gravity conditions, wherein the object would not readily fall into a liquid bath.

FIG. 10 illustrates another embodiment of the invention, in a system 130 wherein an object 132 can be positioned or slowly moved between two locations 134 and 136 within a chamber 138. The object is levitated in the radial direction by one transducer 142, the positioned along the longitudinal axis 144' by another transducer 146. The transducer 146 is driven at two frequencies by two drivers 148, 150. The first driver 148 generates a frequency of a first mode, indicated by the graph 152, which has a pressure well at the location 136. The second driver 150 is driven at twice that frequency, to produce a second mode at 154 with a pressure well at 134 (and also on the opposite side of the chamber). The object can be placed in either of the wells 134, 136 or inbetween by physically placing it there or moving it there by the technique indicated in FIGS. 4–6. With both resonant modes applied along the length of the chamber, the object moves to a position inbetween the two pressure wells 134, 136, with the exact position of the object depending on the relative intensities of the acoustic waves of the two modes. Each driver such as 148 includes an oscillator 156 which delivers its output to an amplifier 158, and the amplifier delivers its output to the transducer 146. The gain of the amplifier can be adjusted by a control 160. Thus, by operating the controls 160 of the two drivers 148, 150, to vary their relative intensities, the object 132 can be made to move to any position between the two pressure wells 134, 136. Such close control of movement can be used, in one example, in crystal growing by slowly moving an elongated mass of material through a region with a controlled temperature gradient.

Figure 11:
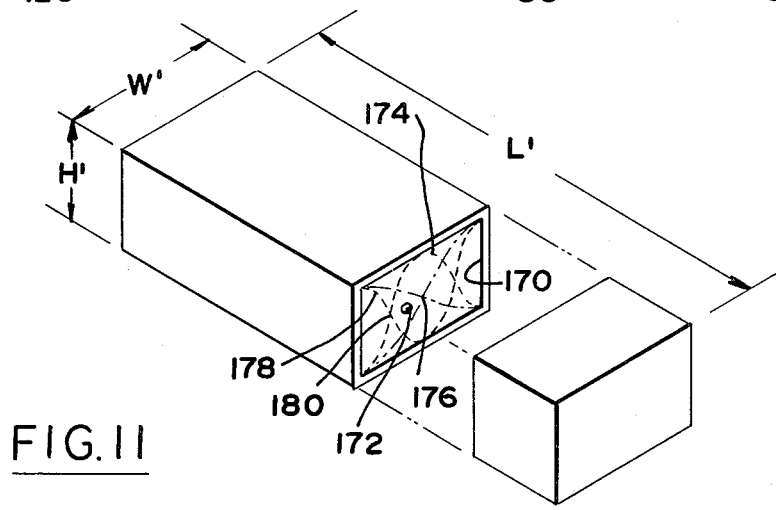
FIG. 11 is a partial perspective and sectional view of apparatus of another embodiment of the invention.

FIG. 11 illustrates another embodiment of the invention wherein a chamber 170 similar to that of FIGS. 1–6 is used to position an object 172 along the width W' of the chamber. The basic approach is the same as in FIG. 10 wherein two resonant modes are applied simultaneously to position the object between pressure nodes or wells. In FIG. 11, a lowest mode 174 along the chamber width has a pressure node at 176. A second lowest mode 178 has a node at 180. The object lies between the nodes 176, 180. The position of the object along its length L' and height H' can be accomplished by the same or other techniques.

Thus, the invention provides a method and apparatus for acoustically positioning an object within a chamber, by the application of a plurality of different resonant modes along the same predetermined direction within the chamber. The modes can be applied sequentially, as by applying a second lowest mode, then a first mode, and then the second mode again, to move an object across the middle of the chamber from one end portion to the other. The modes can be applied simultaneously, with their relative intensities varied to move the object between two pressure wells of the two modes. The acoustic energy of a plurality of modes that are resonant to different dimensions of the chamber, can all be applied to the same end of the chamber, which enables isolation of the transducers from the hot end of a chamber whose other end is cold. The systems can include a variety of chamber cross-sectional shapes, including elliptical.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for moving an acoustically positioned object within a chamber comprising:

applying acoustic energy of a plurality of resonant modes along the same predetermined direction within said chamber, in sequence, to move the object between pressure wells established by said modes, wherein a first mode has a first pressure well and a second mode has pressure wells on initial and final opposite sides of said first pressure well;

said step of applying acoustic energy including applying said first mode at a time when the object lies on said initial side of said first pressure well, to draw said object toward said first pressure well, and then applying said second mode while the object is moving toward said final side.

2. The method described in claim 1 wherein:

said chamber has a length extending in said predetermined direction, and a pair of opposite ends separated by said length, and said chamber has a width; and including applying additional acoustic energy to said chamber which is resonant to the width of the chamber;

said steps of applying acoustic energy of a plurality of modes and applying additional acoustic energy, includes applying all of them to a first of said ends of said chamber.

3. A method for moving an acoustically positioned object within a chamber comprising:

applying a second mode, then a first mode, and then the second mode along a predetermined direction within said chamber, wherein said second mode has pressure wells lying on either side of a first pressure well of said first mode, to move the object from one side of said first well, through said first well, and to a second side of said first well.

4. The method described in claim 3 including:
   detecting the passage of said object at said first pressure well at a time when said first mode is being applied; and wherein
   said step of applying includes ceasing to apply said first mode, and also beginning to apply said second mode, upon the detection of the passage of said object at said first well.

5. A method for moving an acoustically positioned object within a chamber, comprising:
   applying acoustic energy of first and second resonant modes along the same direction within said chamber, said first and second modes having first and second pressure wells, respectively, that are widely spaced apart; and
   introducing an object into the region within said chamber which extends between said first and second pressure wells;
   said step of applying including varying the relative intensities of said first and second modes to control the relative distances of said object from said first and second pressure wells while said object lies in said region.

6. Apparatus for controlling movement of an object, comprising:
   walls forming a chamber of predetermined dimensions; and
   transducer means for applying acoustic energy of a plurality of frequencies to said chamber, said frequencies chosen which are resonant to the chamber dimensions to levitate an object within the chamber;
   said transducer means including means for simultaneously applying two different frequencies which are each resonant to the same chamber dimension but which have pressure wells that are spaced apart, and means for varying the relative intensities of the two different frequencies to control the relative distances from the pressure wells of an object lying between the two pressure wells.

7. Apparatus for applying acoustic energy to an object comprising:
   walls forming a chamber having a width and length and having first and second ends separated by said length; and
   transducer means for applying acoustic energy to said chamber of a plurality of different frequencies that produce wavelengths that are resonant to different corresponding dimensions of said chamber, including the width and length thereof, said transducer means applying all of said acoustic energy to said first end of said chamber;
   said transducer means including a plurality of transducers, each including a transducer element, a tube extending from said element to said chamber, and means for generating an element driving current of predetermined frequency, which produces a predetermined wavelength in said tube, said tube having a length equal to a whole number of half wavelengths of said predetermined wavelength.

8. Apparatus for controlling movement of an object, comprising:
   walls forming a chamber of predetermined dimensions; and
   transducer means for applying acoustic energy of a plurality of frequencies to said chamber, said frequencies chosen which are resonant to the chamber dimensions to levitate an object within the chamber;
   said transducer means including means for switching between a plurality of frequencies which are each resonant to a first chamber dimension, to move the object between pressure wells formed by the different resonant frequencies;
   said plurality of frequencies including a first frequency which produces a first pressure well at the center of said chamber along said first chamber dimension, and a second frequency which produces a pair of pressure wells lying respectively on initial and final sides of said first pressure well; and also including
   means for detecting the passage of an object past said first pressure well, for operating said switching means to switch from said first frequency to said second frequency.

9. Apparatus for controlling movement of an object, comprising:
   walls forming a chamber of predetermined dimensions; and
   transducer means for applying acoustic energy of a plurality of frequencies to said chamber, said frequencies chosen which are resonant to the chamber dimensions to levitate an object within the chamber;
   said transducer means including means for switching between a plurality of frequencies which are each resonant to a first chamber dimension, to move the object between pressure wells formed by the different resonant frequencies;
   said chamber having a length forming said first chamber dimension, and having first and second end portions spaced along said length dimension;
   said frequencies which are each resonant to said first chamber dimension including a first frequency which produces a first pressure well at the center of the chamber length and a second frequency which produces second pressure wells located at said opposite end portions of said chamber; and including
   walls forming an access opening at said first end portion of said chamber, to permit the introduction of an object near the second pressure well which lies at said first end portion of the chamber; and
   means for applying heat to said second end portion of said chamber, to heat the object when it has been moved thereto.

* * * * *